United States Patent [19]
Moore

[11] Patent Number: 5,649,416
[45] Date of Patent: Jul. 22, 1997

[54] COMBINED CYCLE POWER PLANT

[75] Inventor: James H. Moore, Schenectady, N.Y.

[73] Assignee: General Electric Company, Schenectady, N.Y.

[21] Appl. No.: 541,349

[22] Filed: Oct. 10, 1995

[51] Int. Cl.$^6$ ............................................. F02C 6/18
[52] U.S. Cl. .......................... 60/39.15; 60/39.182
[58] Field of Search ................... 60/39.15, 39.182; 307/47, 57, 68, 84

[56] References Cited

U.S. PATENT DOCUMENTS

| | | |
|---|---|---|
| 1,901,873 | 3/1933 | Holzwarth . |
| 3,069,556 | 12/1962 | Apfelbeck et al. .............. 307/57 |
| 3,691,760 | 9/1972 | Vidal et al. . |
| 3,879,616 | 4/1975 | Baker et al. . |
| 4,424,668 | 1/1984 | Mukherjee . |
| 4,519,207 | 5/1985 | Okabe et al. . |
| 4,576,124 | 3/1986 | Martens et al. . |
| 5,042,247 | 8/1991 | Moore . |
| 5,199,256 | 4/1993 | Moore . |
| 5,253,976 | 10/1993 | Cunha . |
| 5,412,937 | 5/1995 | Tomlinson et al. . |
| 5,428,950 | 7/1995 | Tomlinson et al. . |
| 5,471,832 | 12/1995 | Sugita et al. ................... 60/39.182 |

FOREIGN PATENT DOCUMENTS

| | | |
|---|---|---|
| 0363979 | 4/1988 | European Pat. Off. . |
| 0379930 | 8/1990 | European Pat. Off. . |
| 1355952 | 6/1974 | United Kingdom . |
| 1408174 | 10/1975 | United Kingdom . |

OTHER PUBLICATIONS

"GE Combined–Cycle Product Line and Performance", Chase et al, GE Power Generation, 38th GE Turbine State–of–the–Art Technology Seminar, Aug. 1994.

"GE Combined–Cycle Experience", Maslak et al., GE Power Generation, 38th GE Turbine State–of–the–Art Technology Seminar, Aug. 1994.

"Single–Shaft Combined–Cycle Power Generation System", Tomlinson et al., GE Power Generation, 38th Turbine State–of–the Art Technology Seminar, Aug. 1994.

*Primary Examiner*—Louis J. Casaregola
*Attorney, Agent, or Firm*—Nixon & Vanderhye

[57] ABSTRACT

A combined cycle power plant includes at least two gas turbines driving two generators on respective first and second shafts; and a steam turbine having plural sections wherein one or more of the plural sections are on the first shaft and remaining sections of the plural sections are on the second shaft. A variation of the combined cycle power plant includes two gas turbines driving two generators on respective first and second shafts; and a steam turbine including high, intermediate, and low pressure sections on the second shaft.

4 Claims, 4 Drawing Sheets

5,649,416

COMBINED CYCLE POWER PLANT

TECHNICAL FIELD

This invention relates to prime movers for the generation of electricity in combined cycle power plants, utilizing two or more gas turbines.

BACKGROUND PRIOR ART

Combined-cycle power generation equipment is manufactured by GE in two basic configurations, single-shaft and multi-shaft. Single-shaft combined cycle systems consist of one gas turbine, one steam turbine, one generator and one heat recovery steam generator (HRSG), with the gas turbine and steam turbine coupled to a single generator in a tandem arrangement. Multi-shaft combined-cycle systems have one or more gas turbine generators and HRSG's that supply steam through a common header to a separate single steam turbine generator unit. Both configurations perform their specific functions adequately, but the single-shaft configuration excels in the base load and midrange power generation applications.

FIG. 1 is a simplified diagram of a conventional combined cycle power plant including a single gas turbine, single steam turbine and generator on a single-shaft, with a reheat, three-pressure-level steam cycle, represented by a heat recovery steam generator (HRSG). The maximum power rating is limited, however, by the maximum capability of a single gas turbine. In combined cycle plants with unfired boilers, approximately two-thirds of the total power output is produced by the gas turbine and one-third by the steam turbine. Supplemental firing of the heat recovery steam generator can increase the total power output and the portion of the total power produced by the steam turbine, but only with a reduction in overall plant thermal efficiency. The largest gas turbines produced today are rated at somewhat less than 350 MW. Therefore, the steam turbine of a single-shaft combined cycle plant has a maximum rating less than 175 MW. This is much smaller than the steam turbines of modern fossil-fueled steam plants of high efficiency, which are more typically 500 to 900 MW. The single-shaft combined-cycle system has emerged as the preferred configuration for single phase applications in which the gas turbine and steam turbine installation and commercial operation are concurrent.

A conventional multi-shaft combined-cycle system configuration, employing a single gas turbine, single steam turbine and a single HRSG, is illustrated in FIG. 2. This configuration may be applied in phased installations in which the gas turbines are installed and operated prior to the steam cycle installation, and it is frequently applied where it is desired to operate the gas turbines independently of the steam system.

The steam turbine in a multi-shaft configuration with a single gas turbine has the same rating as that of the single-shaft plant, but there is no cost or efficiency benefit due to scale. In fact, the multi-shaft arrangement has somewhat higher cost and poorer efficiency, primarily due to the fact that there are two generators, both smaller than the single generator of the single-shaft machine, and there are a larger number of bearings with their associated power losses.

The usual reason for selecting the multi-shaft arrangement is that it permits the operation of the gas turbine in a simple cycle mode, without operating the steam turbine. This might be desirable for peaking operation or for a phased installation in which the gas turbine is installed first and the steam turbine installed at a later date if the need for power increases. In order to operate the multi-shaft plant in a simple cycle mode, means must be provided to dispose of the exhaust heat from the gas turbine. This can be done by dumping the steam produced in the HRSG directly to the condenser, bypassing the steam turbine, or by bypassing the exhaust gas around the HRSG with an auxiliary exhaust stack. Either method adds cost and design and operating complexity to the plant.

In summary, the single-shaft plant of FIG. 1 has the advantages of lower cost, higher efficiency, and simplicity of design and operation; whereas the multi-shaft plant of FIG. 2 has an advantage in operating flexibility in that it can be operated in simple cycle as well as combined cycle mode.

More frequently, multi-shaft plants are designed with two gas turbines and a single steam turbine as shown in FIG. 3. The output of this plant is twice that of those in FIGS. 1 and 2. The output of the single steam turbine is doubled and cost and efficiency benefits due to scale are associated with the steam turbine and condenser. However, to achieve the potential benefits of operating flexibility expected of multi-shaft plants, a separate HRSG for each gas turbine is required, so that the benefits of scale are not achieved by the entire steam plant. Since the output of this plant is doubled, a comparison with a single-shaft plant must be made with one having two identical units of the design shown in FIG. 1. In this comparison, the multi-shaft plant has advantages in terms of cost and efficiency because of the single, larger steam turbine and condenser. However, these advantages are offset somewhat by the following:

1. There are three separate machines rather than two, with a greater total number of thrust and journal bearings with associated power losses.

2. There are cost and efficiency penalties associated with three one-third size rather than two half-size generators.

3. The practical construction of a plant with three separate machines to achieve a degree of independent operation involves considerable complexity in piping, valves and control equipment. The addition of isolation valves in all main steam, and cold and hot reheat steam lines, and in numerous auxiliary steam lines adds cost and parasitic pressure drop and also reduces reliability.

The net effect is that the multi-shaft plant with two gas turbines has a net efficiency advantage over the two half-size single shaft units. Neither configuration is considered to have a clear cost advantage over the other.

With this background, a brief summary of the problems addressed by this invention is provided below. The steam cycle portion of a combined cycle power plant is more expensive to build and has a lower thermal efficiency than is the case for a modern conventional steam power plant. This is due, in part, to basic differences in the thermodynamic cycles of heat recovery and conventional, fired-boiler applications, which can not be changed. However, it is also due to the small size and power rating of the equipment.

Conventional steam power plants benefit in both lower cost and higher efficiency through the economies of scale of large ratings. A traditional rule of thumb regarding cost is that the doubling of plant rating results in a ten percent reduction in cost. The cost of one large generating unit according to this rule would be expected to cost on the order of ten percent less than that for a plant with two half-size units.

Efficiency is also improved with increased size and power rating. As with all turbomachinery, the internal efficiency of the steam turbine is a strong function of inlet volumetric flow, which is directly proportional to rating. Also, as is well known, the thermal efficiency of the Rankine cycle increases with the pressure at which steam is generated. Increasing pressure, however, reduces the volumetric flow of the steam at the turbine inlet, reducing the internal expansion efficiency. This offsetting effect in overall efficiency, however, is much greater at low volumetric flow than at higher volumetric flow. Therefore, an additional performance-related benefit of increasing turbine size is that higher steam throttle pressure can be utilized more effectively.

SUMMARY OF THE INVENTION

The object of the invention is to provide for a combined cycle power plant having the advantages and desirable characteristics of the present single-shaft plant designs, but utilizing more than one gas turbine and achieving the potential cost and performance benefits of larger steam cycle equipment.

To this end, two or more rotating power trains are employed, depending upon the required total power output of the plant. Each shaft is made up of one gas turbine and one generator, and preferably includes one or more sections of a steam turbine. In the basic configuration, the machine consists of two shafts, driving separate electric generators but operated together as a single unit. The primary shaft consists of a gas turbine in combination with one or more sections of a steam turbine driving one generator; the secondary shaft consists of a second gas turbine combined with the remaining sections of the steam turbine driving the second generator. The various steam turbine sections on the two shafts together make up a single cross-compound steam turbine.

Variations in the basic configuration are possible, as is the extension to larger ratings based on three or more gas turbines. The machine has the basic features and characteristics of current single-shaft combined cycle units, but unlike current designs, is not limited in output by the maximum power rating of a single gas turbine. The reduced cost and improved thermal efficiency of larger steam cycle components is achieved without the use of a separate steam turbine generator. Therefore, there is always one less rotating power train, including generator, than required by current multi-shaft combined cycle plants. A combined cycle power plant constructed in accordance with this invention will have lower cost and better thermal efficiency than that of plants built today with either single-shaft or multi-shaft designs.

More specifically, the basic and presently preferred configuration of the present invention employs two gas turbines, and one steam turbine on two shafts, and as in a conventional steam plant with a cross compound steam turbine, both shafts always operate together. This permits cost savings through use of only one boiler, one condenser, one transformer and one circuit breaker for connection to the grid. The combined high-pressure (HP)/intermediate-pressure (IP) section of the steam turbine is coupled with one gas turbine on a primary shaft and the low-pressure (LP) section is coupled with the second gas turbine on a secondary shaft. The LP steam turbine section on the secondary shaft receives, as its input, steam from the exhaust of the IP section on the primary shaft. The two generators are tied together electrically prior to startup, or at low speed, by applying excitation to both fields. They are then accelerated to rated speed together and synchronized to the electrical grid as a single generator. The gas turbines are held at low load until the HRSG is warmed and sufficient steam pressure has been developed to begin admission of steam into the steam turbine. Prior to this point, cooling steam from an auxiliary source is required for cooling purposes in the LP turbine to remove heat generated by rotational losses.

A variation on this basic arrangement including separate HRSG's, transformers and circuit breakers, permits the primary shaft with the HP/IP steam turbine section to be started and synchronized to the grid first. When sufficient steam production rate is established in the associated HRSG, steam is admitted to the steam turbine to produce electrical power from the primary shaft, and torque on the LP shaft for accelerating to full speed.

Another alternative arrangement includes separate HP and IP sections on separate shafts and two double-flow LP sections, one on each shaft.

In the basic configuration, the equipment arrangement on each shaft is with the generator on one end and the steam and gas turbine connected by solid couplings and utilizing a single thrust bearing to maintain proper axial alignment between rotating and stationary components in the manner described in U.S. Pat. No. 4,961,310. It is recognized that other arrangements, such as one having the generator between the gas and steam turbines are possible and are within the scope of this invention. Furthermore, the invention is equally applicable with other steam cycles, such as non-reheat or double-reheat, or one with more or less than three separate pressure levels, and with bottoming cycles having other working fluids or fluid mixtures.

In still another alternative configuration, the steam turbine is on only one of the two shafts. This design also achieves the cost and performance benefits of the single large steam turbine without requiring the third shaft and generator of the multi-shaft design.

The description of the invention, to this point, has for convenience, been based on an application employing two gas turbines. The concept, however, applies equally well to plants with more than two gas turbines. For example, three gas turbines can be employed in which the first shaft has no steam turbine elements, and can be operated in simple cycle, and to produce steam for starting the other two shafts by driving the steam turbine. An extension to four gas turbines is also described herein.

In its broader aspects then, the present invention relates to a combined cycle power plant comprising at least two gas turbines driving two generators on respective first and second shafts; and at least one steam turbine having plural sections wherein one or more of the plural sections are on the first shaft and remaining sections of the plural sections are on the second shaft.

In another aspect, the invention relates to a combined cycle power plant comprising two gas turbines driving two generators on respective first and second shafts; and a steam turbine including high, intermediate, and low pressure sections on the second shaft.

Other objects and advantages of the invention will become apparent from the detailed description which follows.

BEST MODE FOR CARRYING OUT THE INVENTION

Figure 1:
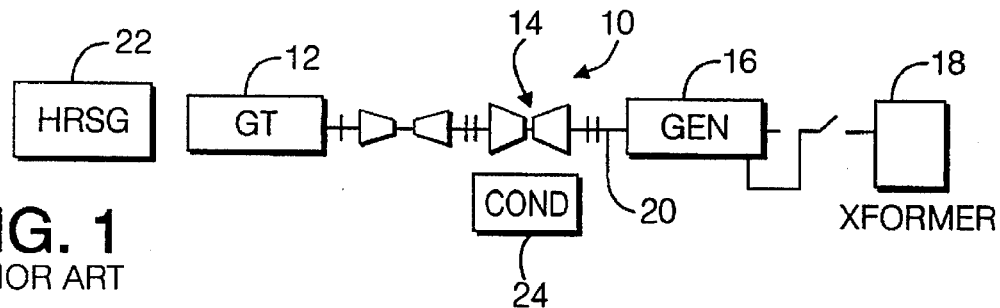
FIG. 1 is a simplified diagram of a conventional single shaft combined cycle power plant.

With reference again to FIG. 1, a conventional single-shaft combined cycle power plant 10 is shown to include a single gas turbine 12, a single steam turbine 14 and a generator 16 connected to a transformer 18. The unit is arranged on a single rotor or shaft 20. The plant also includes a conventional heat recovery steam generator, or HRSG, 22 in which energy from the exhaust gases exiting the gas turbine 12 is recovered. More specifically, water from the steam turbine condenser 24 is converted to steam which, in turn, drives the steam turbine 14.

Figure 2:
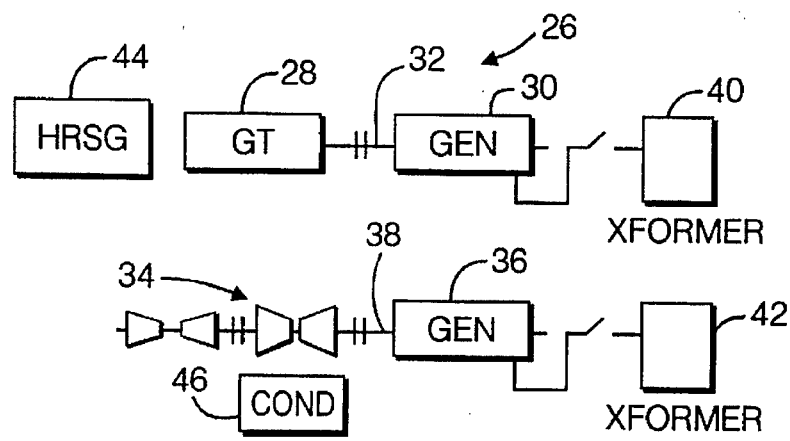
FIG. 2 is a simplified diagram of a conventional multi-shaft combined cycle power plant.

FIG. 2 illustrates a conventional multi-shaft combined cycle power plant 26 which includes a single gas turbine 28 coupled to a generator 30 on one shaft 32, and a single steam turbine 34 coupled to its own generator 36 via a second shaft 38. In this arrangement, generator 30 is connected to one transformer 40, while generator 36 is connected to a second transformer 42. An HRSG 44 interacts with the gas turbine 28 and steam turbine 34 (via condenser 46) essentially in the same manner as in the single shaft configuration.

Figure 3:
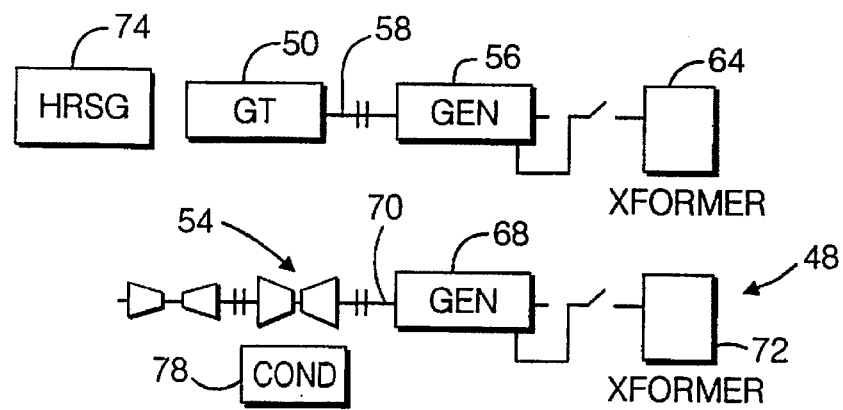
FIG. 3 is a simplified diagram of a conventional, three shaft, two gas turbine combined cycle power plant.
Figure 3:
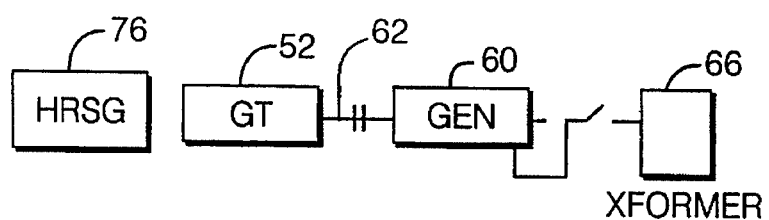

FIG. 3 illustrates another conventional multi-shaft arrangement 48 which includes two gas turbines 50, 52 and a single steam turbine 54. Here, gas turbine 50 is coupled to generator 56 on one shaft 58, while gas turbine 52 is coupled to a second generator 60 on a second shaft 62. Generator 56 is connected to a first transformer 64, while generator 60 is connected to a second transformer 66. The single steam turbine 54 is coupled to a third generator 68 on a third shaft 70. Generator 68 is connected to a third transformer 72. In this arrangement, a pair of HRSG's 74, 76 are required, one for each gas turbine, with condensed steam from steam turbine condenser 78 supplying both HRSG's.

Figure 4A:
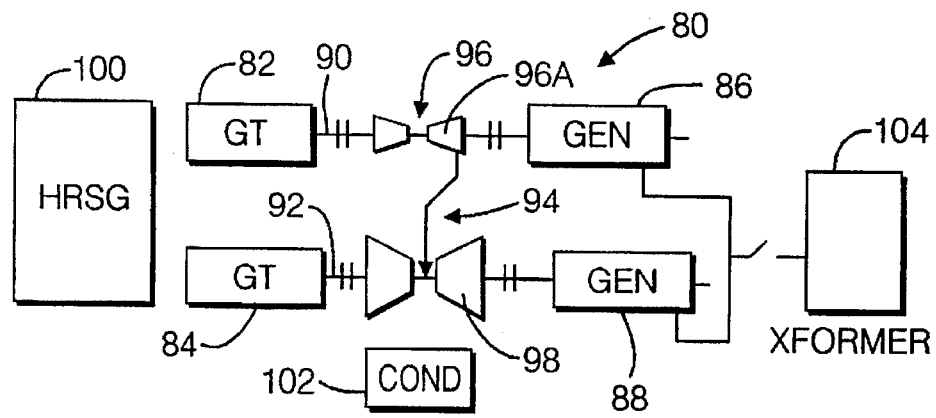
FIG. 4a is a simplified diagram of a combined cycle power plant in accordance with this invention, employing two gas turbines and one steam turbine on two shafts.

Turning now to FIG. 4a, the basic, and presently preferred, combined cycle power plant configuration in accordance with this invention is illustrated, also in simplified form. In this arrangement, a combined cycle power plant 80 includes a pair of gas turbines 82, 84 coupled to respective generators 86, 88 via shafts 90, 92. A single cross-compound steam turbine 94 is arranged with the combined HP/IP section 96 on the primary shaft 90, and the LP section 98 on the secondary shaft 92. The LP section 98 receives, as its input, steam from the exhaust of the IP section 96A on the primary shaft 90. As in any conventional cross-compound steam turbine, both shafts 90 and 92 work together. As a result, only one HRSG 100 is required, receiving exhaust gases from both gas turbines 82 and 84, along with condensed steam from the steam turbine condenser 102. In addition, only one transformer 104 (and thus, only one circuit breaker) is required for connection to the power grid.

In the above described arrangement, the two generators 86, 88 are tied together electrically prior to startup, or at low speed, by applying excitation to both fields. The generators 86, 88 are then accelerated to rated speed and synchronized to the power grid as a single generator. The gas turbines 82, 84 are then held at low load until sufficient steam pressure is developed in HRSG 100 to permit admission of steam to the steam turbine 94. Prior to this point, cooling steam from an auxiliary source (not shown) is required for cooling purposes in the LP turbine section 98 to remove heat generated by rotational losses.

Figure 4B:
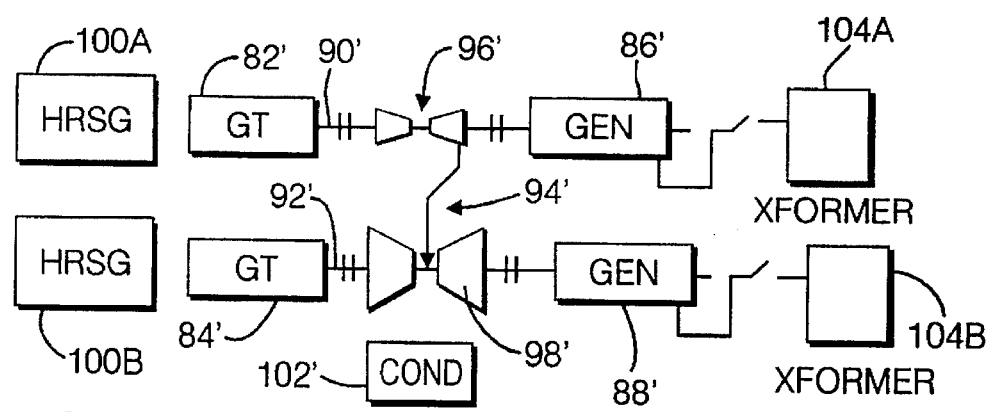
FIG. 4b is a variation of FIG. 4a, wherein separate HRSG's, transformers and circuit breakers are employed with the pair of gas turbines.

Turning now to FIG. 4b, a variation of the preferred arrangement of FIG. 4a is illustrated. The arrangement here is similar to that shown in FIG. 4a, except that each gas turbine 82', 84' has its own HRSG 100A and 100B, respectively, and each generator 86', 88' has its own transformer 104A and 104B, respectively (and thus separate circuit breakers). This arrangement permits the primary shaft 90' with the HP/IP steam turbine section 96' to be started and synchronized to the grid first. Then, after sufficient steam production is established in HRSG 100A, steam is admitted to the steam turbine 94' to produce electrical power from the primary shaft 90' and torque on the secondary shaft 92' for accelerating to full speed.

The advantages here are that the capacity of the auxiliary steam source is greatly reduced because the need for cooling steam in the LP turbine section 98', and the need for a means of cranking the secondary shaft 92' are eliminated. These benefits must be weighed against the greater cost of the two separate HRSG's 100A and 100B, associated piping and isolating valves, as well as separate transformers 104A, 104B and associated circuit breakers. The machines of both FIGS. 4a and 4b, in comparison with the multi-shaft arrangement of FIG. 3, have the characteristics, advantages and disadvantages of single-shaft combined cycle plants. The term single-shaft may be applied here because there is one shaft for each gas turbine, producing power from both the gas turbine and from its exhaust heat by means of heat recovery in a steam cycle. No separate, additional generator and power train is required to produce power in the steam cycle.

It should be recognized that the LP section 98, 98' shown as double-flowed in FIGS. 4a and 4b, respectively, could be single-flowed, or could have three or four flows in two casings as required to achieve the optimum exhaust annulus area for the application. Also, the HP and IP sections 96, 96' could be in separate casings rather than combined in one.

Figure 5:
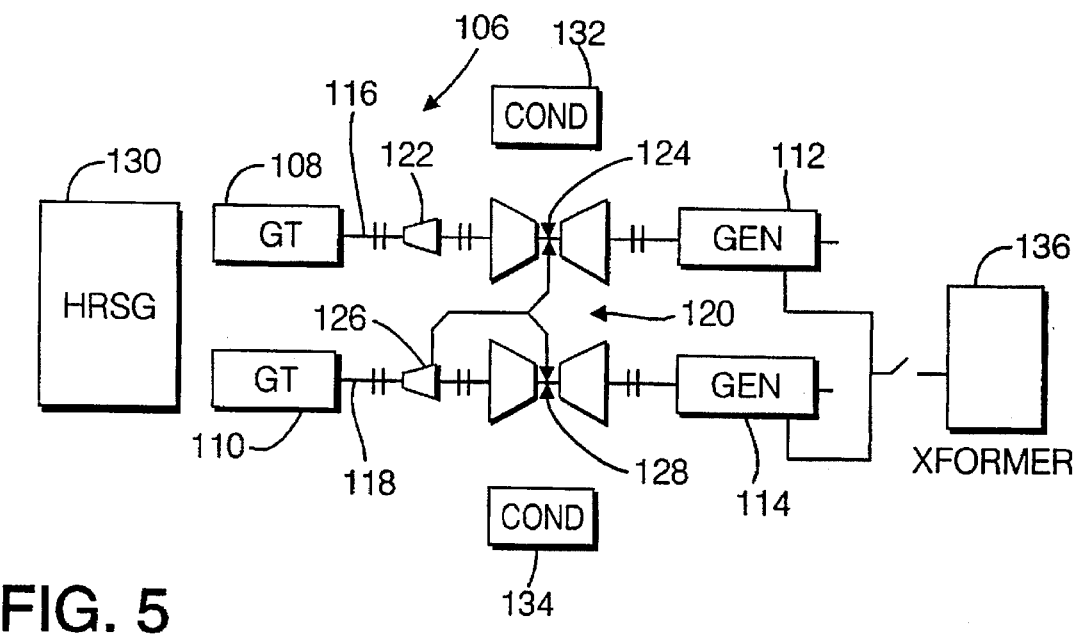
FIG. 5 is a simplified diagram of another variation of FIG. 4a, employing separate high and intermediate pressure sections of the steam turbine on separate shafts and two double flow low pressure sections, one on each shaft.

With reference now to FIG. 5, another combined cycle arrangement in accordance with this invention is shown which is similar to that shown in FIG. 4a with the exception that the steam turbine has HP and IP sections on separate shafts, and an LP section on each shaft. Specifically, the combined cycle plant 106 includes a pair of gas turbines 108, 110 coupled to respective generators 112, 114 via separate shafts 116, 118. The steam turbine 120 is arranged with an HP section 122 and a double flow LP section 124 on the one shaft 116, and an IP section 126 and double flow LP section 128 on the other shaft 118. In this arrangement, a single HRSG 130 and two condensers 132, 134 are employed. Generators 112, 114 are connected to a single transformer 136 via a circuit breaker. This design is more costly because there are more steam turbine casings and two condensers, and would be employed where the application requires more exhaust annulus area than could be achieved with one double-flow LP section.

Figure 6:
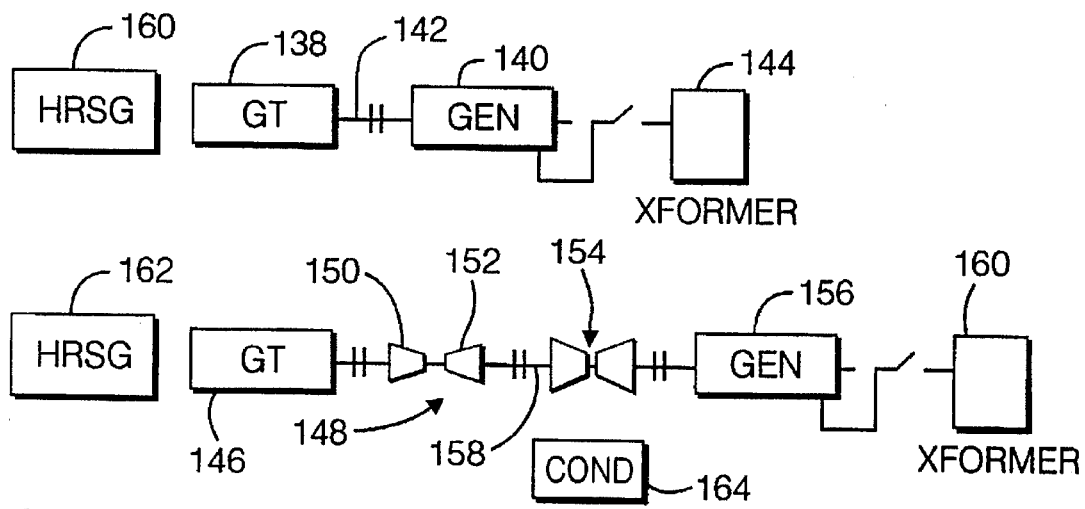
FIG. 6 is a variation of FIG. 4b wherein the steam turbine sections are all on one of the two shafts.

In still another variation shown in FIG. 6, the steam turbine is on only one of two shafts. Specifically, a first gas turbine 138 is coupled to a generator 140 on one shaft 142, and the generator 140 is connected to a first transformer 144. A second gas turbine 146, steam turbine 148 (including HP, IP and LP sections 150, 152 and 154, respectively) and a generator 156 are arranged on a second shaft 158. The generator 156 is connected to a second and separate transformer 160. Each gas turbine 138, 146 is associated with an HRSG 160, 162, respectively, which receive condensed steam from the condenser 164 of the steam turbine 48.

A benefit of this alternative arrangement is that either shaft 142, 158 can be operated alone, one in simple cycle and the other in combined cycle. For combined cycle operation with both shafts, the one without the steam turbine (shaft 142) starts first, and produces electrical power while developing steam pressure in its associated HRSG 160. This steam is then used to start the second shaft 158 by driving with the steam turbine 148, completely eliminating the need for an auxiliary steam source. The cost of equipment for cranking the gas turbine 138 for starting is reduced for the first shaft 142 because there is no steam-turbine-rotor inertial load, and can be eliminated completely for the second shaft 158. Also, it is not necessary that the two HRSG's 160, 162 be identical. For instance, there may be an advantage in reduced cost and complexity to have a reheater section only in the HRSG 162 corresponding to the shaft 158 with the steam turbine 148.

Figure 7:
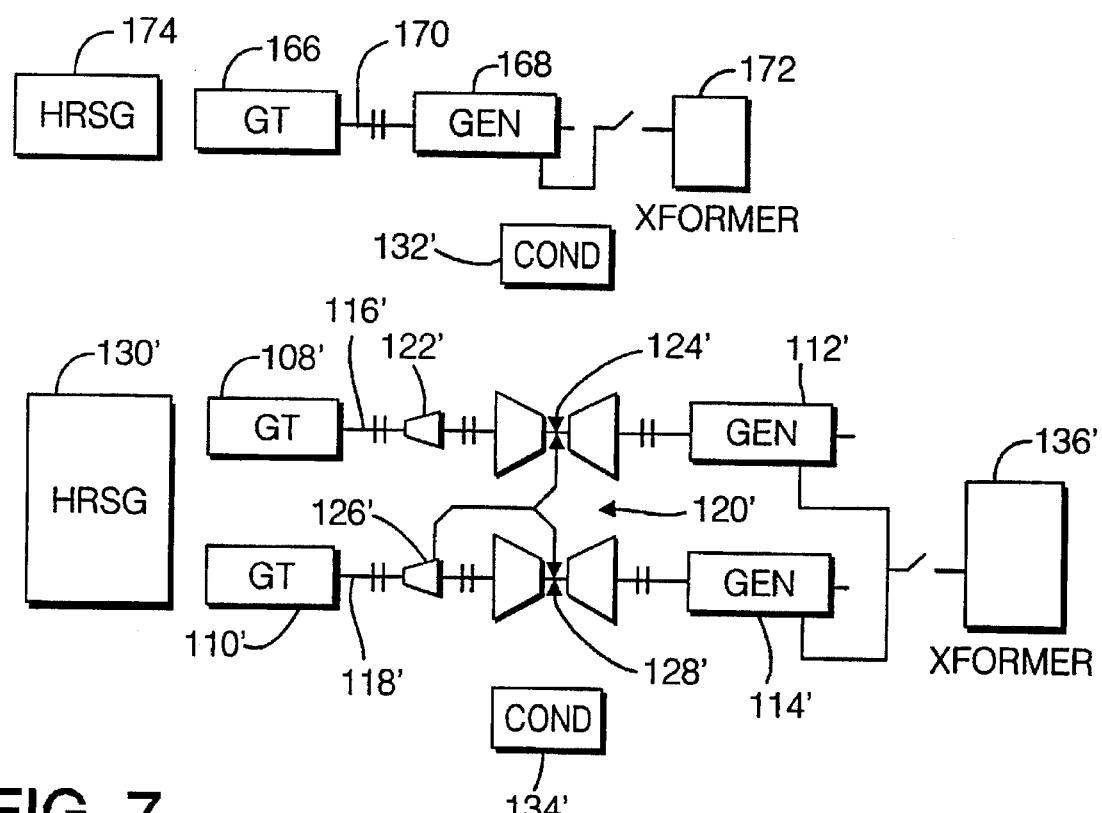
FIG. 7 is a simplified diagram of a combined cycle power plant in accordance with the invention, utilizing three gas turbines, in which one shaft has no steam turbine elements.

FIG. 7 illustrates a combined cycle plant employing three gas turbines. A first gas turbine 166 is coupled directly to a generator 168 on a first shaft 170. The generator, in turn, is connected to a first transformer 172. Gas turbine 166 has its own HRSG 174. The remaining components of this plant are essentially as described in connection with FIG. 5 and, for convenience, the same reference numerals are used in the drawings, but with a "prime" designation added to denote corresponding components. The steam turbine 120', however, has 50 percent greater power output in this plant than in the two gas turbine plant of FIG. 5 and, therefore, has cost and efficiency advantages due to the economies of scale. With the third gas turbine 166 on a separate shaft 170, this arrangement can be operated in simple cycle, and to produce steam for starting the other two shafts 116', 118' by driving the steam turbine 120'.

Figure 8:
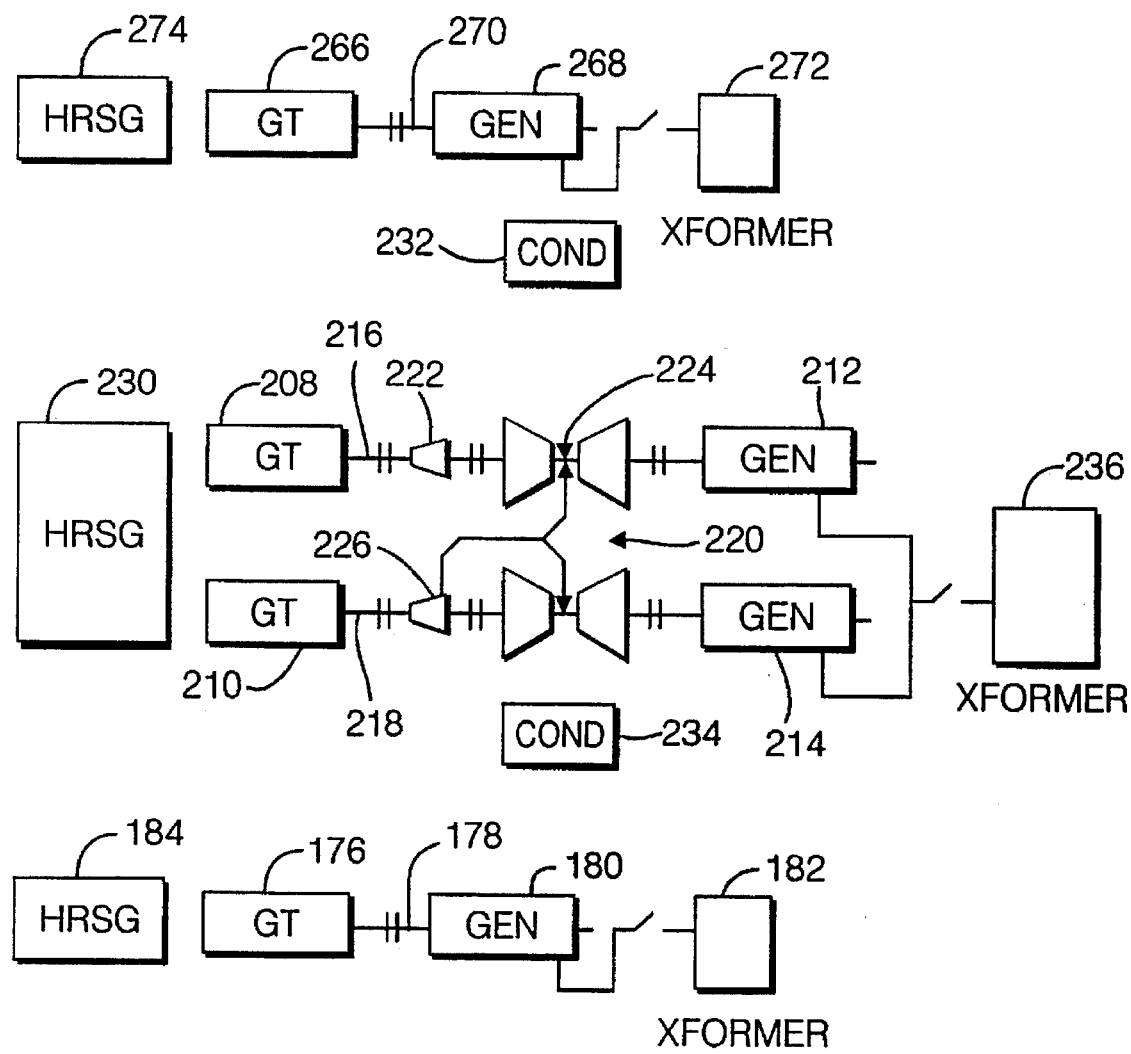
FIG. 8 is a still another embodiment of the invention, utilizing four gas turbines.

FIG. 8 illustrates still another combined cycle plant which builds on the plant shown in FIG. 7 including a fourth gas turbine 176 on a separate shaft 178 coupled directly to a fourth generator 180 connected to a third transformer 182. A third HRSG 184 is employed for use with the gas turbine 176, the former receiving condensed steam from the steam condenser 234. The remaining plant components are as shown and described in connection with FIGS. 7 and 5. These remaining components have reference numbers similar to those used in FIG. 7 but with the prefix "2" substituted for the prefix "1 " or "1'".

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined cycle power plant comprising at least two gas turbines driving two generators on respective first and second shafts; and a single steam turbine having plural sections including a single high pressure section, wherein one or more of said plural sections are on said first shaft and remaining sections of said plural sections are on said second shaft.

2. A combined cycle power plant comprising at least two gas turbines driving two generators on respective first and second shafts; and a steam turbine having plural sections wherein one or more of said plural sections are on said first shaft and remaining sections of said plural sections are on said second shaft, and further comprising a single heat recovery steam generator by which exhaust gas from the at least two gas turbines is used to heat condensed stream from the steam turbine.

3. A combined cycle power plant comprising at least two gas turbines driving two generators on respective first and second shafts; and a steam turbine having plural sections wherein one or more of said plural sections are on said first shaft and remaining sections of said plural sections are on said second shaft, wherein high and intermediate steam turbine section are on said one shaft and a low pressure steam turbine section is on said second shaft, and further wherein steam from said intermediate section is input to said low pressure section.

4. The combined cycle power plant of claim 1 and including a single transformer connected to both generators.

* * * * *